H. FOUASSE.
SINGLE TUBE AND DOUBLE TUBE OPTICAL GLASS.
APPLICATION FILED MAR. 23, 1918.
Patented Apr. 29, 1919.
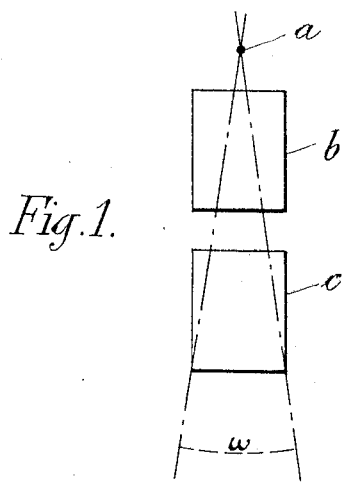
Fig. 1.
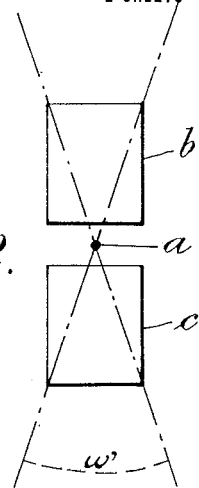
Fig. 2.
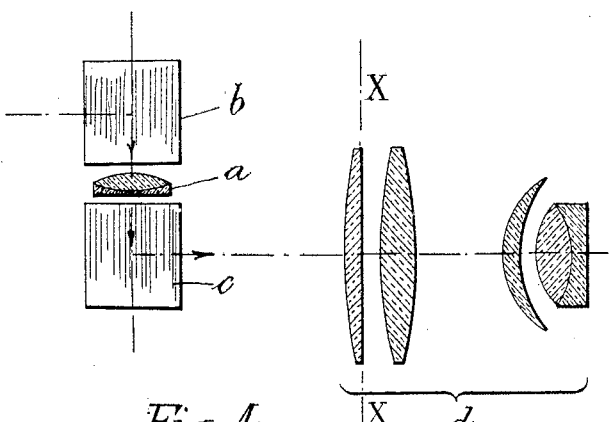
Fig. 3.
Fig. 4.
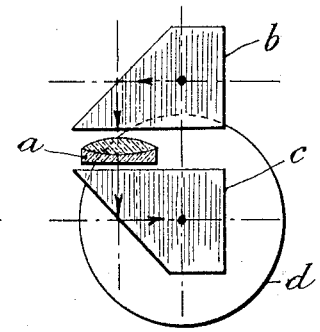
Fig. 5.
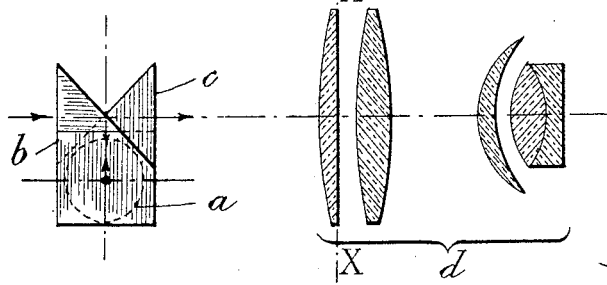
Inventor:
Henri Fouasse
By
Mauro, Cameron, Lewis & Massie
Attorneys.

H. FOUASSE.
SINGLE TUBE AND DOUBLE TUBE OPTICAL GLASS.
APPLICATION FILED MAR. 23, 1918.

1,302,351.

Patented Apr. 29, 1919.

Inventor:
Henri Fouasse
By
Mauro, Cameron, Lewis & Massie,
Attorneys.

UNITED STATES PATENT OFFICE.

HENRI FOUASSE, OF PARIS, FRANCE, ASSIGNOR TO SOCIETE D'OPTIQUE ET DE MECANIQUE DE HAUTE PRECISION, OF PARIS, FRANCE, A JOINT-STOCK COMPANY OF FRANCE.

SINGLE-TUBE AND DOUBLE-TUBE OPTICAL GLASS.

1,302,351.  Specification of Letters Patent.  Patented Apr. 29, 1919.

Application filed March 23, 1918. Serial No. 224,360.

*To all whom it may concern:*

Be it known that I, HENRI FOUASSE, a citizen of the French Republic, and a resident of 125 Boulevard Davout, Paris, France, have invented a new and useful Improvement in Single-Tube and Double-Tube Optical Glasses, which invention is fully set forth in the following specification.

The present invention relates to an improvement in optical prismatic apparatus, such as single and double tube optical glasses, which gives to the instruments a wide field of view while permitting them to be of sizes of small dimensions.

The improvement consists essentially in placing the objective between the erecting prisms.

The present invention is characterized, moreover, by a special combination of erecting prisms which permits their dimensions being reduced and in consequence the size of the instrument.

In the accompanying drawing:

Figure 1 shows diagrammatically the ordinary arrangement of prisms of single and double tube optical glasses;

Fig. 2 represents similarly the improved optical arrangement according to the present invention.

Figs. 3, 4 and 5 show respectively in elevation, in plan and in end view an optical train embodying the improved optical arrangement.

In single and double tube optical glasses in which the image is erected by means of prisms disposed according to ordinary arrangements, the angle of the real field of view $w$ is limited, as shown in Fig. 1, by the fact that the length of the luminous pencil, emanating from the objective $a$ and traversing the system of erecting prisms $b$ $c$ is very great, about four times the width of the exit face of the latter prism. This arrangement presents no inconvenience in instruments of strong magnifying power where the angle of the real field of view is limited by the value of the apparent field of view to which the high magnification gives rise.

In instruments with small magnifying power, on the contrary, the field of view is always necessarily reduced, for, if in order to obtain a larger field the dimensions of the prisms are increased, the instrument is not only bulky but its construction would be unrealizable by reason of the formation of the image in the interior of these prisms.

The improvement, the object of the present invention, consists in placing the objective $a$ between the two prisms $b$ and $c$ as shown in Fig. 2.

In this arrangement of the objective $a$, the field of view angle $w'$ is much greater than in the case of the ordinary arrangement shown in Fig. 1, where the objective is placed in front of the first erecting prism $b$.

The improved optical arrangement can be applied to different forms of single and double tube optical glasses.

Figs. 3 to 5 show an optical train in which the objective $a$ is placed between two doubly reflecting erecting prisms $b$ $c$ of the Crova type.

In this arrangement, the image, which is formed in the plane XX, is, by reason of the large field view which the instrument gives, greater than the erecting prisms, and is produced at a distance from these latter sufficient to permit the employment of lenses of considerable converging character for the eye piece $d$ as shown in Figs. 3 and 4.

Figure 6:
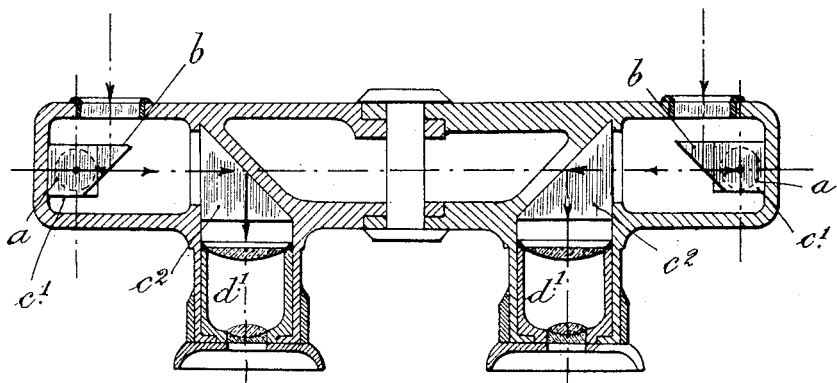
Figs. 6 and 7 represent in horizontal section and vertical section a double tube optical glass having a wide base arranged according to the invention.
Figure 7:
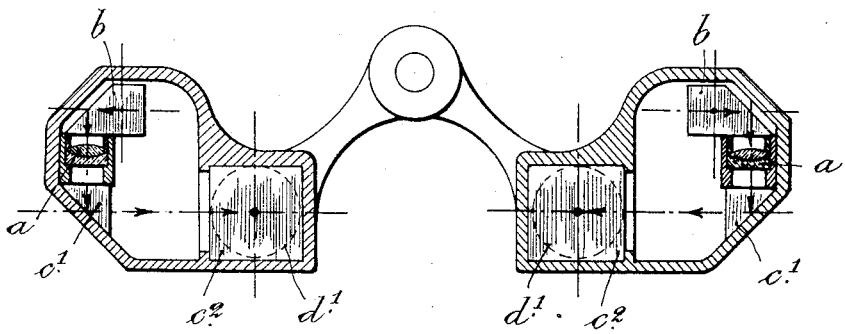

Figs. 6 and 7 represent a double tube glass with a wide base, comprising the optical arrangement described above and also a special combination of erecting prisms which allows of a reduction in the dimensions of these latter and consequently in the size of the instrument.

In this glass each objective $a$ is placed between a doubly reflecting prism $b$ of the Crova type, by which the luminous rays enter, and a simple total reflecting prism $c'$; another similar prism $c^2$ effects the erection of the image and reflects the luminous pencil into the corresponding eye piece $d'$; these two total reflecting prisms $c'$, $c^2$ are orientated or disposed, respectively, in such a manner that their reflecting surfaces cause the erection of the image in the same manner as a Crova prism.

This arrangement permits dimensions being given to prisms $b$, $c'$ corresponding to the diameter of the objective $a$, and consequently greatly reduced dimensions when the instrument is required only to give a small magnification; the last prism $c^2$ only should be sufficiently large to receive or include the image.

Double tube glasses can thus be made to have a wide field of view, and any base regulated by the separation of the two prisms $c'$, $c^2$.

The described arrangement can be applied especially to the construction of glasses for use at sea and in theaters, which glasses would have the advantage over ordinary prismatic glasses of having a wide field of view and great clearness, while at the same time would be of small bulk.

It will be understood that the details of construction for applying the improved optical arrangement can be modified to suit different instruments.

Having thus fully described the nature of the said invention and the best means we know of carrying the same into practical effect, I claim:—

In a double tube optical glass with wide base, the combination in each tube of an optical train comprising an objective, a doubly reflecting prism of the Crova type on one side of the objective, and a simple total reflecting prism on the other side of the objective, with a simple total reflecting prism and an eye piece, said last-named prisms being so disposed that the reflecting surfaces thereof cause an erection of the image similarly to a Crova prism and reflect the luminous pencil to the eye-piece.

In testimony whereof I have signed this specification.

HENRI FOUASSE.

Witnesses:
HENRI MONIN,
MARCEL GUILLEMOT.